United States Patent
Buttafoco

(10) Patent No.: US 7,079,995 B1
(45) Date of Patent: Jul. 18, 2006

(54) TACTILE SIMULATOR FOR USE IN CONJUNCTION WITH A VIDEO DISPLAY

(76) Inventor: Nina Buttafoco, 63-40 72nd St., Middle Village, NY (US) 11379

( * ) Notice: Subject to any disclaimer, the term of this patent is extended or adjusted under 35 U.S.C. 154(b) by 718 days.

(21) Appl. No.: 10/339,850

(22) Filed: Jan. 10, 2003

(51) Int. Cl.
G06G 7/48 (2006.01)
G06G 7/56 (2006.01)

(52) U.S. Cl. .............................. 703/6; 703/5
(58) Field of Classification Search .................... 703/5, 703/6
See application file for complete search history.

(56) References Cited

U.S. PATENT DOCUMENTS

| 5,299,810 A | * | 4/1994 | Pierce et al. ................... 463/2 |
| 5,388,992 A | | 2/1995 | Franklin et al. ............ 434/114 |
| 5,565,840 A | | 10/1996 | Thorner et al. .......... 340/407.1 |
| 5,669,818 A | * | 9/1997 | Thorner et al. ................ 463/30 |
| 5,984,880 A | | 11/1999 | Lander et al. ............... 600/595 |

* cited by examiner

Primary Examiner—Hugh Jones
(74) Attorney, Agent, or Firm—Goldstein Law Offices PC

(57) ABSTRACT

A tactile simulator for use in conjunction with a video display. The tactile simulator comprises a tactile bar, and a video program player capable of generating audio, video, and control outputs upon reading a video medium having encoded simulation control information. The signals which are transmitted to the tactile bar by the video program player control the motion of weights located within the tactile bar, vibration of motors within the tactile bar, and temperature changes of the tactile bar. Two motors having eccentric weights cause the tactile bar to selectively vibrate. Additionally, the movement of the weights within the tactile bar impart a sense of motion. Two embodiments of the tactile bar are presented. The first embodiment is "U" shaped and is connected by wire to a control output on the video program player. A second version is wireless and receives infrared signals generated by the video program player.

5 Claims, 5 Drawing Sheets

TACTILE SIMULATOR FOR USE IN CONJUNCTION WITH A VIDEO DISPLAY

BACKGROUND OF THE INVENTION

1. Field of the Invention

The invention relates to a tactile simulator for use in conjunction with a video display. The tactile simulator comprises a tactile bar, a video program player, and specially encoded video media. The tactile simulator provides a user with vibrating sensations, hot and cold sensations, and sensations of motion while viewing one of the specially encoded video media.

2. Description of the Related Art

A variety of devices have been created which attempt to provide a user of various communications devices, such as television and pre-recorded media, with tactile effects, in addition to the visual display that accompanies the media. U.S. Pat. No. 5,984,880 to Lander appears to show a tactile feedback device for use with television and pre-recorded media.

U.S. Pat. No. 5,388,992 to Franklin appears to show a method for producing mechanical vibrations on a user's skin, in response to pre-recorded audio signals from a device, such as a television.

U.S. Pat. No. 5,565,840 to Thorner appears to show a tactile sensation generator for use with a video game.

While these units may be suitable for the particular purpose employed, or for general use, they would not be as suitable for the purposes of the present invention as disclosed hereafter.

SUMMARY OF THE INVENTION

It is an object of the invention to produce a tactile simulator which provides a viewer of a video program with an enhanced sense of realism. Accordingly, encoded signals from the special video media cause the tactile bar to selectively vibrate in synchronicity with events which are portrayed on the television screen, and thereby provide the user with an enhanced sense of realism. Furthermore, movement of weights within the tactile bar alter the weight distribution of the tactile bar and its balance, and thus afford the user with a sense of motion. Finally, the tactile bar will also change temperature, depending on events being depicted on the television screen.

It is yet another object of the invention to produce a tactile simulator which is not unduly expensive. Accordingly, the cost of the electrical components of the tactile bar, the modified video program player, and the special video media, is not prohibitive.

The invention is a tactile simulator for use in conjunction with a video display. The tactile simulator comprises a tactile bar, and a video program player (VCR, DVD player, etc.) capable of generating audio, video, and control outputs upon reading video media having encoded simulation control information. The signals which are transmitted to the tactile bar by the video program player control the motion of weights located within the tactile bar, vibration of motors within the tactile bar, and temperature changes of the tactile bar. Two motors having eccentric weights cause the tactile bar to selectively vibrate. Additionally, the movement of the weights within the tactile bar impart a sense of motion. Two embodiments of the tactile bar are presented. The first embodiment is "U" shaped and is connected by wire to a control output on the video program player. A second version is wireless and receives infrared signals generated by the video program player.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

FIGS. 1–7 illustrate a tactile simulator 10, comprising a tactile bar 12, video media which contain a video program, sound associated with the video program, and have encoded simulation control information, and a video program player 24 capable of generating audio, video, and control outputs upon reading the video media. The video program player may be a conventionally used technology, such as a VCR, wherein the video media is VCR tapes having the simulation control information magnetically recorded thereon; a DVD player having simulation control information written thereon; or any other current or prospective technology which is used to play a audio/visual program from media.

Two embodiments of the tactile simulator 10 are provided, one in which the tactile bar 12 is a wireless bar 12W, and one in which the tactile bar 12 is a wired bar 12U. Both embodiments comprise substantially the same functional elements. The two embodiments differ primarily in the shape and size of the tactile bar 12, and in the manner in which the tactile bar 12 receives control output signals from the video program player 24. Accordingly, the following full description of the embodiment wherein the tactile bar 12 is a wireless bar 12W will suffice as a description of the functional elements of the wired bar 12W. A description of the particular size and shape characteristics of the wired bar 12U, as well as a description of the mode of communication of the video control player 24 with the wired bar 12U, will follow the full description of the wireless bar 12W.

Figure 5:
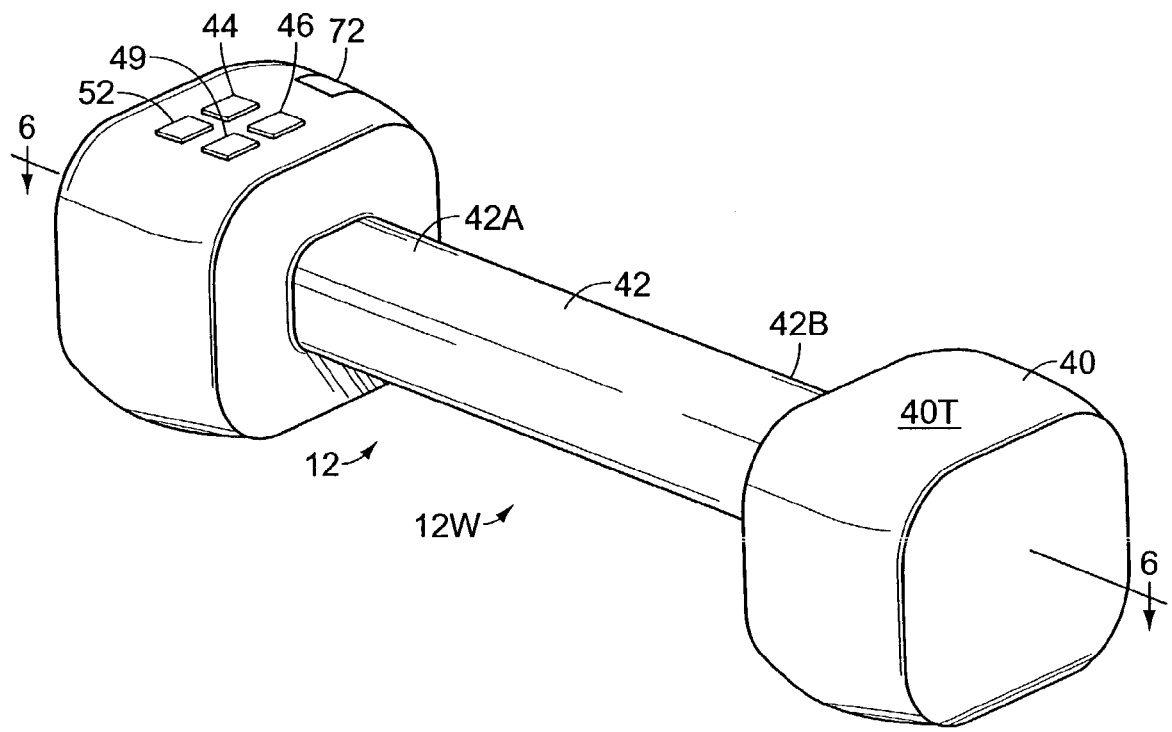
FIG. 5 is a perspective view of the wireless bar.

Turning momentarily to FIG. 5, the wireless bar 12W is shown. The wireless bar 12W is not physically connected to other components of the system and is comprised of a substantially cylindrical central hand-grip portion 42 having a first end 42A and a second end 42B, and a bulbous protuberance 40 at the first end 42A and the second end 42B.

Figure 6:
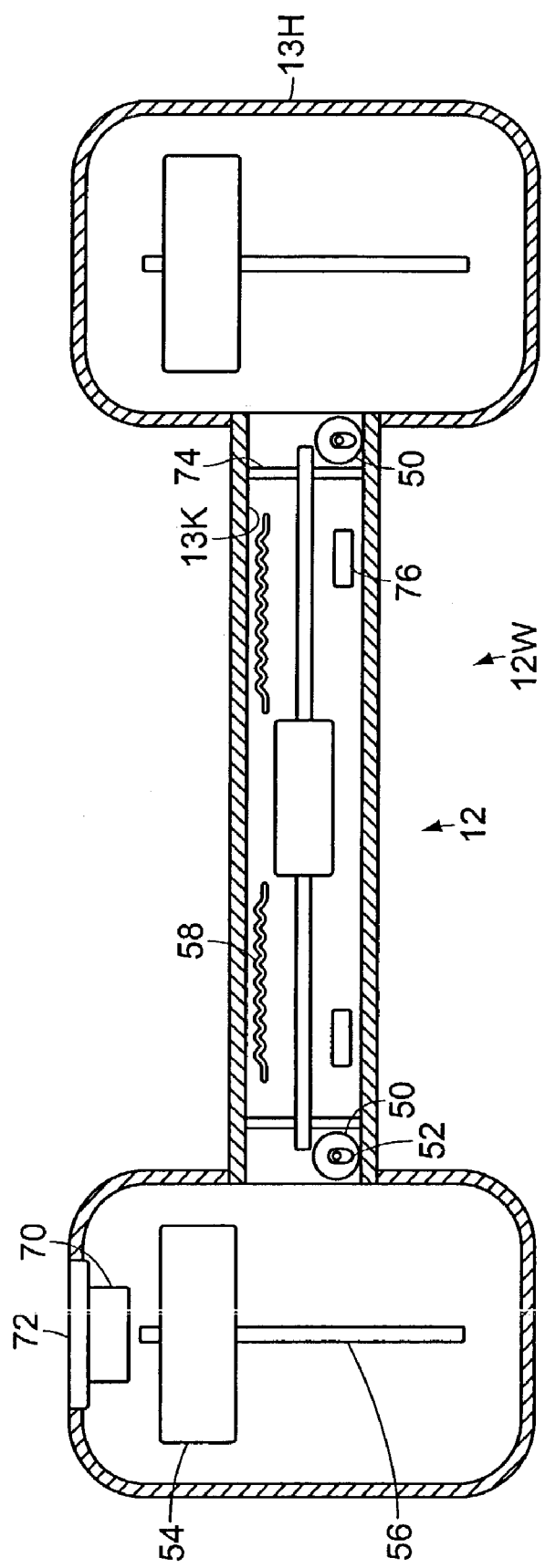
FIG. 6 is a cross-sectional view of the wireless bar taken generally in the direction indicated by line 6—6 in FIG. 5.

Turning momentarily to FIG. 6, the wireless bar 12W is shown in cross-section to illustrate internal components thereof. The wireless bar has a housing 13H having an inside surface 13K. The wireless bar 12W has two vibrating motors 50 within the hand-grip portion 42. Eccentric weights 52 attached to each of the vibrating motors 50 causes the motors 50 to selectively vibrate. Each vibrating motor 50 is in mechanical contact with the wireless bar 12W, and vibration of the vibrating motors 50 causes a corresponding vibration of the wireless bar 12W and especially the central hand-grip portion 42 thereof. The vibrating motors 50 are controlled by signals transmitted by the video program player 24 which are encoded on the special video media.

The hand-grip portion 42 of the wireless bar 12W contains movable weights 54 and tracks 56 within which the movable weights 54 may slide. Similarly, each of the bulbous protuberances 40 also has a track 56, and a movable weight 54 which selectively slides within the track 56. The movable weights 54 are ordinarily positioned upon the tracks 56 to balance the wireless bar 12W as best as possible. The wireless bar 12W further has spacers 74 for mounting the tracks 56 to the inside surface 13K of the housing 13H and centering the track 56 therein. Various technology—ranging from Linear electric motors to a threaded motor shaft may be used to move the movable weights 54 along their tracks 56. According to the present invention, a change in weight distribution of the wireless bar 12W is controlled by the encoded simulation control signals generated by the video program player 24 which are derived from the special media that is being viewed on the television screen 64. The movement is varied and intermittent and is tailored to make the scenes which are depicted on the television screen 64 more realistic.

The wireless bar 12W has two heating coils 58 and two solid state semiconductor cooling devices 76 located within the hand-grip portion 42. The heating coils 58 and the semiconductor cooling device 76 are capable of heating and cooling the hand-grip portion 42 in response to the control signals. The cooling device 76 selectively lowers the temperature of the wireless bar 12W using the Peltier effect.

One of the bulbous protuberances 40 has an on/off button 44 and power selection buttons 46, 52, and 49 on its surface. The on/off switch 44 selectively activates the wireless bar 12W. The power selection buttons 46, 50, and 52 control the amplitude of the vibrations of the wireless bar 12W. Indicia label the on/off switch 44 with the words "on/off", and also label the power selection buttons 46, 52, and 49, with the words "low", "medium", and "high", respectively. The lowest amplitude of mechanical vibration is achieved when the "low" power selection button 46 has been depressed. More pronounced vibrations are achieved when the "medium" power selection button 52 has been depressed. The strongest vibrations occur when the "high" power selection button 49 has been depressed. The vibrating motors 50 are controlled according to the user's selection.

The video program player 24 used with both embodiments of the tactile simulator 10 is similar to a conventional video program player but incorporates additional circuitry and components which generate control signals that are electrically transmitted to the tactile bar 12. Both the wireless bar 12W and the wired bar 12U contain a logic unit 70 which processes signals which are received from the video program player 24. Similarly, the video program player 24 provided with both embodiments decodes and transmits signals from the specially encoded videocassette, thereby causing the temperature of the heating coils 58 and the semiconductor cooling device 76, and causing the movable weights 54 to move within their tracks 56.

However, the mode of communication of the simulation control signals from the video program player 24 to the wireless bar 12W differs from that of the wired bar 12U. The wireless bar 12W communicates with the video program player 24 by receiving infrared signals therefrom representing the simulation control signals. In particular, the video program player 24 which is provided with the wireless bar 12W has an infrared emitter which emits signals which are received by the wireless bar 12W. The wireless bar 12W has an infrared receiver 72 located on the bulbous protuberance 40 attached to the first end 42A of the hand-grip portion 42 for receiving signals generated by the infrared emitter of the video program player 24. The logic unit 70 processes simulation control signals which are received by the infrared receiver 72, thereby controlling vibration effects, heating and cooling effects, and weight distribution of the movable weights 54 located within the wireless bar 12W.

Figure 1:
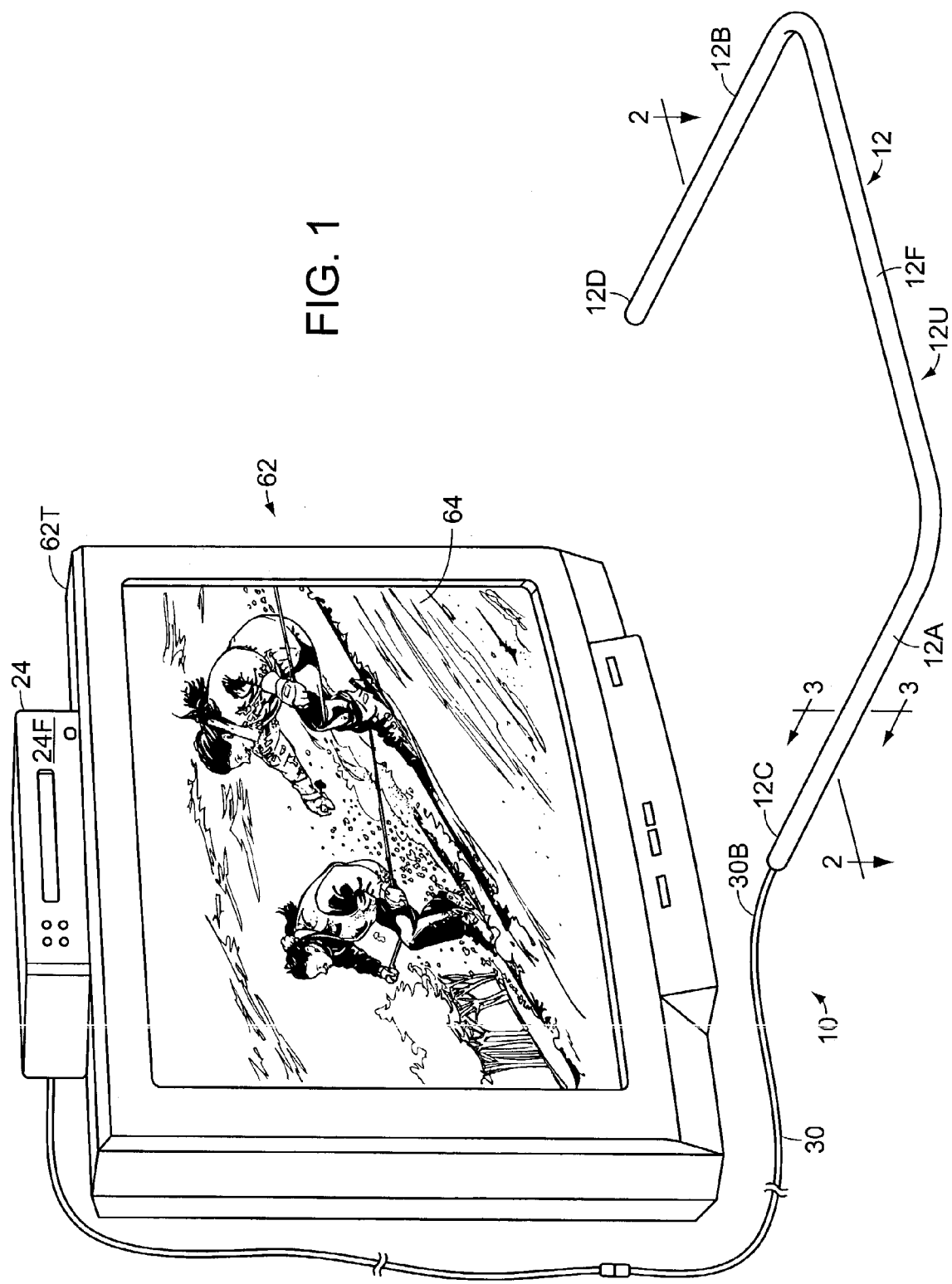
FIG. 1 is a perspective view of the wired bar after it has been connected to a video program player

FIG. 1 illustrates a perspective view of the second embodiment of the tactile simulator 10, comprising a wired tactile bar 12U, video media which have encoded simulation control information, and a video program player 24 capable of generating audio, video, and control outputs upon reading the video media. The video program player 24 is used in conjunction with a television set 62 having a top surface 62T and a television screen 64. The video program player 24 is positioned on the top surface 62T of the television set 62.

The size and shape characteristics of the wired bar 12U differs somewhat from that of the wireless bar 12W. In particular, the wired tactile bar 12U is "U" shaped, and has a first end 12C and a second end 12D, a central portion 12F, a first side portion 12A, and a second side portion 12B. The first side portion 12A extends perpendicularly from the central portion 12F and terminates in the first end 12C. Similarly, the second side portion 12B extends perpendicularly from the central portion 12F and terminates in the second end 12D. The first side portion 12A is preferably separated from the second side portion 12B by a distance of approximately 2.5 feet.

Figure 2:
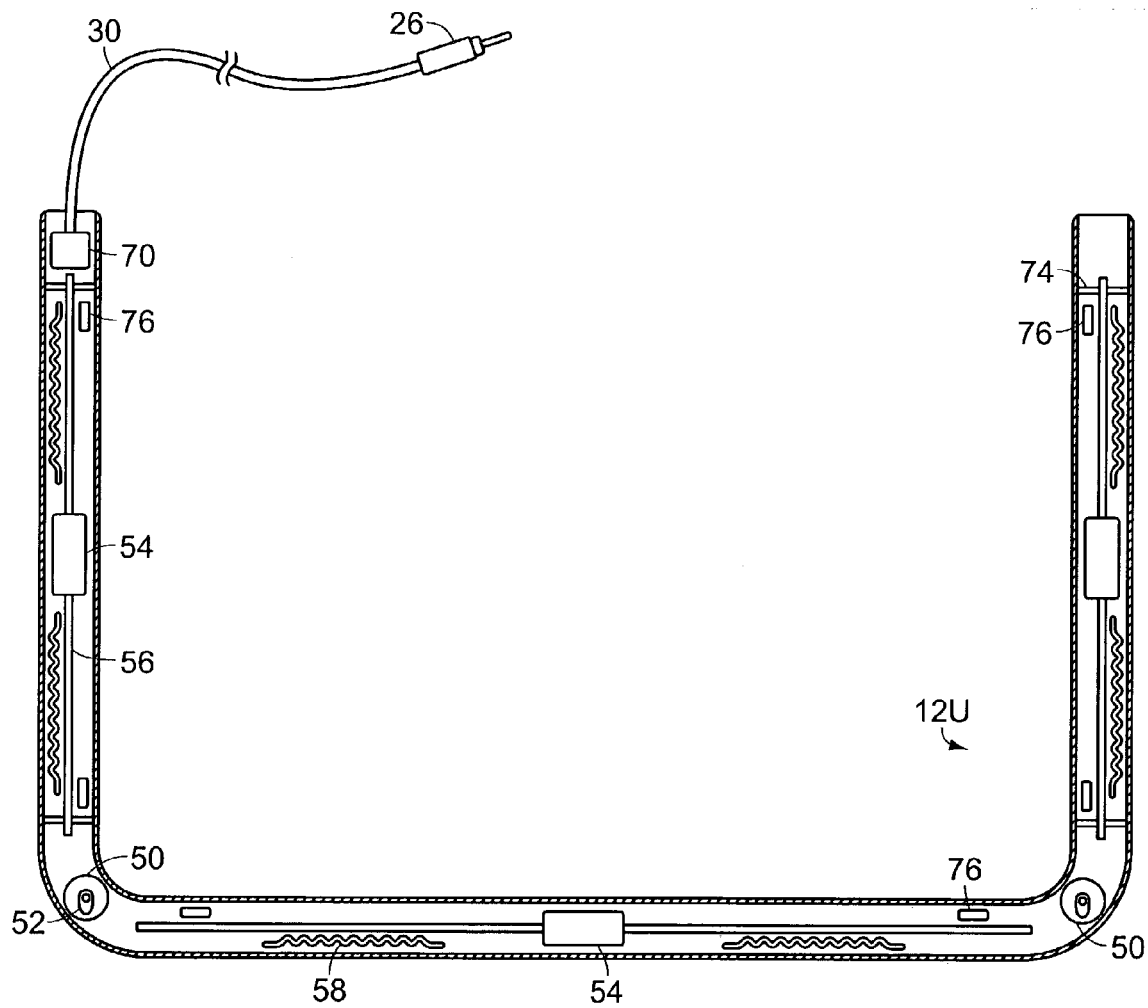
FIG. 2 is a cross-sectional view of the wired bar taken generally in the direction indicated by line 2—2 in FIG. 1.

The wired bar 12U contains substantially the same functional elements as the wireless bar 12W. Turning momentarily to FIG. 2, which illustrates a cross-sectional view of the wired bar 12U, the wired bar 12U has two vibrating motors 50 located at the junction of the side portions 12A and 12B and the central portion 12F of the wired bar 12U, each having an eccentric weight 52 for causing the motors 50 to selectively vibrate. Additionally, the wired bar 12U has movable weights 54 and tracks 56 within which the movable weights 54 may slide. The movable weights 54 and their accompanying tracks 56 are located in the central portion 12F, the first side portion 12A, and the second side portion 12B. The wired bar 12U contains spacers 74 for mounting the tracks 56. Furthermore, the wired bar 12U has a plurality of heating coils 58 and semiconductor cooling devices 76 located within the central portion 12F, the first side portion 12A, and the second side portion 12B.

The first end of the wired bar 12U contains within it a logic unit 70. The logic unit 70 controls heating/cooling effects, vibration effects, and motion effects of the wired bar 12U.

Figure 3:
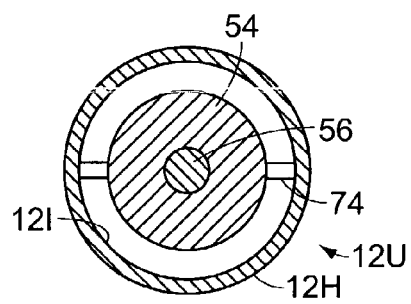
FIG. 3 is a cross-sectional view of a portion of the wired bar taken generally in the direction indicated by line 3—3 in FIG. 1.

FIG. 3 is a cross-sectional view of a portion of the wired bar 12U taken generally in the direction indicated by line 3—3 in FIG. 1. The wired bar 12U has a housing 12H having an inside surface 12I. The movable weight 54 selectively slides upon a track 56. The track 56 is mounted to the inside surface 12I of the housing 12H.

The mode of communication of the wired bar 12U with the video program player 24 is different from that of the wireless bar 12W. The wired bar 12U has a control cable 30 attached to the first end 12C. The control cable 30 has a first end 30A which terminates in a connection jack 26 for receiving signals from the video program player 24. The second end 30B of the control cable 30 is in electrical contact with the logic unit 70 located inside the first end 12C of the wired bar 12U.

Figure 4:
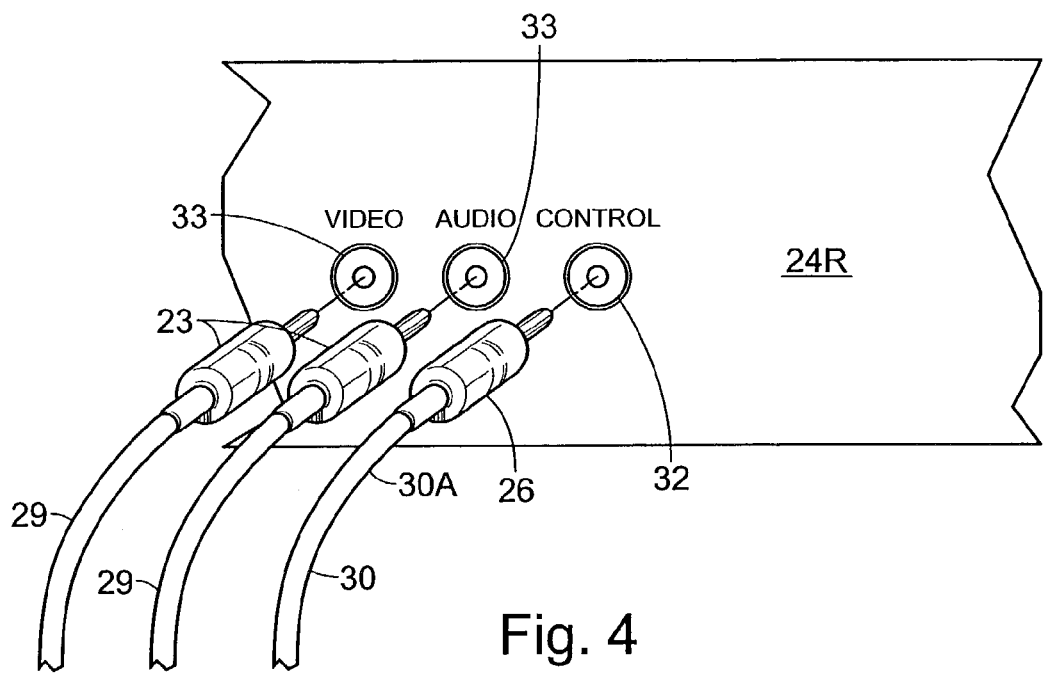
FIG. 4 is a perspective view of rear output connections on the video program player which accompanies the wired bar, showing conventional audio and video connection jacks, as well as the control cable, being positioned for insertion therein.

FIG. 4 illustrates the rear panel 24R of the video program player 24 which accompanies the wired bar 12U. The rear panel 24R has two conventional audio and video outputs 33 which are used to electrically connect the video program player 24 to a television monitor. Conventional audio and video connector cables 29 which terminate in jacks 23 are plugged into the conventional audio and video outputs 33 on the rear panel 24R of the video program player 24. Additionally, the rear panel 24R has a control output 32. The control cable 30 extending from the wired bar 12U is plugged into the control output 32 of the VCR 24. The control cable 30 transmits signals from the control output 32 of the video program player 24 to the logic unit 70 located within the first end 12C of the wired bar 12U.

The wired bar 12U may also be provided with an/off button for selective powering thereof, and with power selection switches, as were described above for the wireless bar 12W.

Figure 7:
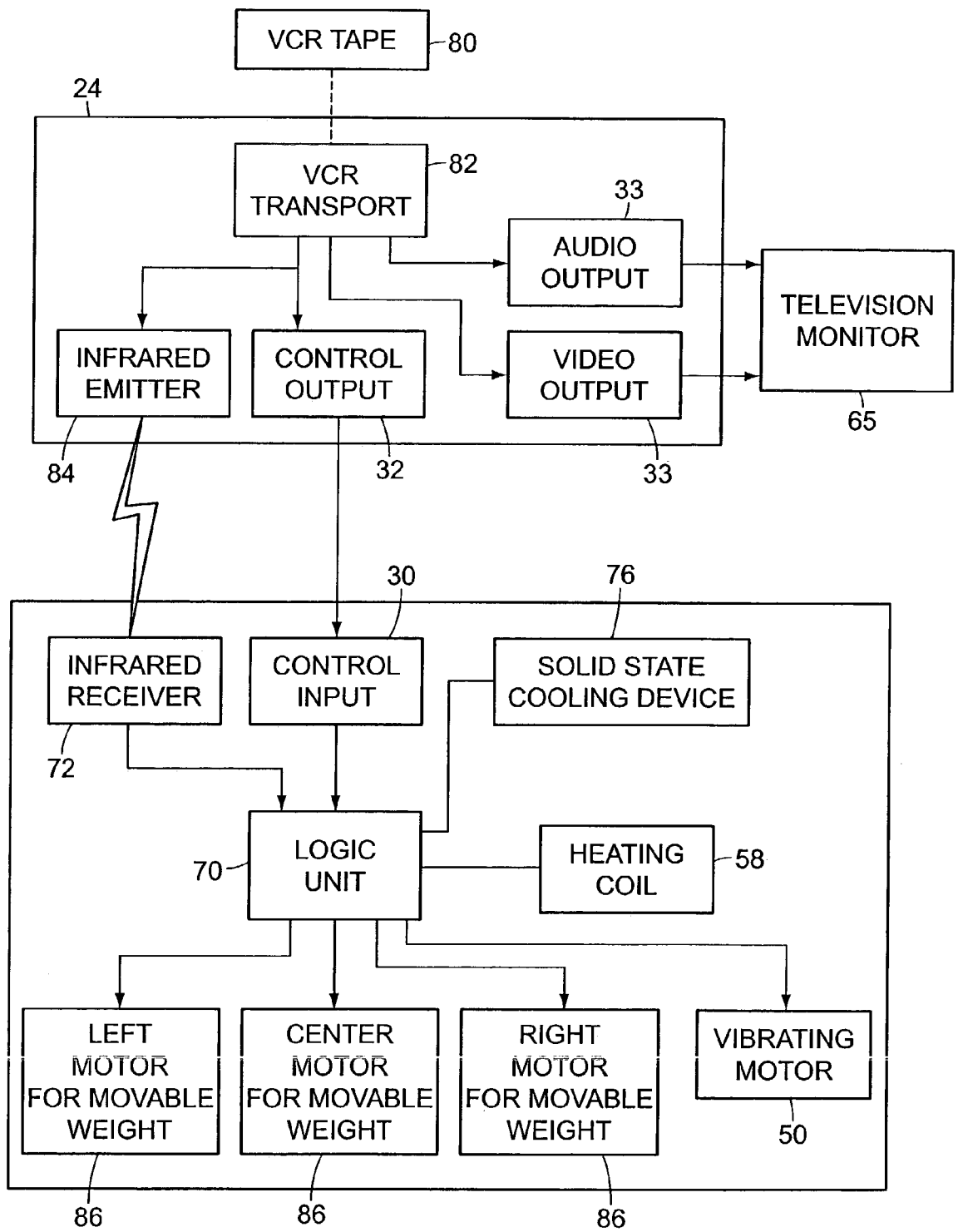
FIG. 7 is a block diagram illustrating interconnection of various electrical components of the invention.

FIG. 7 is a block diagram illustrating interconnection of various electrical components of the invention, wherein the video program player is illustrated as being a video cassette recorder (VCR), and the video media is a videocassette. In particular, the video program player 24 has a VCR transport 82. A specially encoded videotape 80 placed within the VCR transport 82 transmits signals to the television monitor 65 via conventional audio and video outputs 33. The VCR transport 82 also transmits signals to the tactile bar 12.

FIG. 7 serves to illustrate the differences in the mode of communication between the VCR 24 and the two embodiments of the tactile bar 12. In the case of the wireless bar 12W, the signals are transmitted by the infrared emitter 84 located upon the VCR 24. The wireless bar 12W receives the simulation control signals from the VCR 24 via an infrared receiver 72.

In the case of the wired bar 12U, the signals are transmitted by the control output 32 on the VCR 24. The wired bar 12U receives the simulation control signals from the VCR 24 via the control input 30.

Once the signals are received by either embodiment of the tactile bar 12, the signal pathway is substantially the same. Signals received by either the infrared receiver 72 of the wireless bar 12W or by the control input 30 of the wired bar 12U are processed by the logic unit 70. The logic unit 70 controls all of the tactile effects that are provided by the tactile bar 12. In particular, the logic unit 70 controls the semiconductor cooling devices 76 and also the heating coils 58, and thereby controls the temperature of the tactile bar 12. Additionally, the logic unit 70 controls the motors 86 which position the movable weights 54 at various locations within the tracks 5, and thereby controls the sensation of motion which is selectively provided by the tactile bar 12. Finally, the logic unit 70 controls the vibrating motors 50, and thereby controls the sensation of vibration which is selectively provided by the tactile bar 12.

In a general sense, to use the wireless bar 12W, a user having at least one hand first inserts the specially encoded video media into the video program player. Next, the user ensures that the conventional audio and video outputs 33 have been electrically connected to the television monitor 65. The user then powers the infrared emitter 84 on the video program player 24. The user powers the wireless bar 12W by turning on the on/off switch 44. The user chooses a desired level of vibration by depressing the appropriate power selection button 46, 52, or 49. The user then starts playing the specially encoded videocassette. By grasping the hand-grip portion 42 of the wireless bar 12W with one or both hands, the user experiences the temperature effects, the vibration effects, and the motion effects of the tactile simulator 10, in synchronicity with events depicted on the video display. When finished using the wireless bar 12W, the user simply turns off the on/off switch 44 and turns off the infrared emitter 84 on the VCR 24, and removes the specially encoded videotape from the VCR transport.

A user uses the wired bar 12U in a similar fashion as the wireless bar 12W. There are, however, several differences, due to the difference in the mode of communication of the wired bar 12U with the video program player 24. Firstly, the user must insert the connection jack 26 on the control cable 30 which leads from the first end 12C of the wired bar 12U into the control output 32 located on the rear panel 24R of the VCR 24. Additionally, the user may position one or both hands along either the first side portion 12A, the second side portion 12B, or the central portion 12F of the wired bar 12U. Alternately, the user may even lie down upon the wired bar 12U, in which case the tactile effects may be felt by the torso or the back of the user. When finished using the wired bar 12U, the user removes the specially encoded video media from the video program player, and turns off the power to the video program player. The user may then remove the control cable 30 from the control output 32 on the rear panel 24R of the video program player. The video program player and television set may now be used as an ordinary video program player and television set.

In conclusion, herein is presented a tactile simulator for use in conjunction with a video display. The invention is illustrated by example in the drawing figures, and throughout the written description. It should be understood that numerous variations are possible, while adhering to the inventive concept. Such variations are contemplated as being a part of the present invention.

What is claimed is:

1. A tactile simulator for use in conjunction with a video display, and also in conjunction with a television set having a television screen, comprising:
   a) special video media having encoded simulation control information;
   b) a video program player having a rear panel having a conventional audio output and a conventional video output, said video program player capable of generating audio and video, and control outputs upon reading the special video media; and
   c) a tactile bar having a substantially cylindrical central hand-grip portion having a first end and a second end, and perpendicular side portions attached to each end, said tactile bar capable of receiving the control output from the video program player, said tactile bar further having a logic unit for processing signals which are received by the video program player, said tactile bar further having two vibrating motors for vibrating the central hand-grip portion, wherein each vibrating motor is in mechanical contact with the tactile bar, wherein said vibrating motors are controlled by the encoded control signals transmitted by the video program player which are read from the video media, wherein the hand-grip portion and each of the side portions of the tactile bar further contain movable weights and tracks upon which the movable weights may slide, said movable weights being capable of moving along the tracks under the control of the logic unit, for selectively providing a change in weight distribution of the tactile bar in response to the control signals, said tactile bar also having at least one heating coil and at least one semiconductor cooling device, for selectively heating or cooling the wireless bar under the control of the logic unit.

2. The tactile simulator as recited in claim 1, wherein the video program player further comprises an infrared emitter for transmitting the encoded simulation control information, and wherein the tactile bar further comprises an infrared receiver for receiving signals generated by the infrared emitter of the video program player.

3. The tactile simulator as recited in claim 1, wherein the video program player further comprises a control output, and wherein the tactile bar further comprises a control cable having a first end which terminates in a jack which is inserted in the control output of the video program player, and having a second end which is connected to the logic unit located within the tactile bar.

4. The tactile simulator as recited in claim 1, wherein the tactile bar has an on/off button for selective activation of the wireless bar, and power selection buttons for controlling the amplitude of the vibrations of the tactile bar, and wherein indicia label the on/off switch with the words "on/off", and also label the power selection buttons with the words "low", "medium", and "high", respectively, and wherein the lowest amplitude of mechanical vibration is achieved when the "low" power selection button has been depressed, wherein more pronounced vibrations are achieved when the "medium" power selection button has been depressed, and wherein the strongest vibrations occur when the "high" power selection button has been depressed.

5. A method of using a tactile simulator in conjunction with a video display by a user having at least one hand, in conjunction with a television set having a television screen, said tactile simulator having special video media having encoded simulation control information, a video program player having an infrared emitter which emits signals, said video program player having a rear panel having a conventional audio output and a conventional video output, said video program player capable of generating audio, video, and control outputs upon reading the special video media, and a tactile bar having a substantially cylindrical central hand-grip portion having a first end and a second end, and perpendicular side portions attached to each end, said tactile bar capable of receiving the control output from the video program player, said tactile bar further having a logic unit for processing signals which are received by the video program player, said tactile bar further having two vibrating motors for vibrating the central hand-grip portion, wherein each vibrating motor is in mechanical contact with the tactile bar, wherein said vibrating motors are controlled by the encoded control signals transmitted by the video program player which are read from the special videocassette, wherein the hand-grip portion and each of the side portions of the tactile bar further contain movable weights and tracks upon which the movable weights may slide, said movable weights being capable of moving along the tracks under the control of the logic unit, for selectively providing a change in weight distribution of the tactile bar in response to the control signals, said tactile bar also having at least one heating coil and at least one semiconductor cooling device, for selectively heating or cooling the tactile bar under the control of the logic unit, comprising the steps of:
  a) grasping the central hand-grip portion of the tactile bar with the at least one hand of the user;
  b) reading encoded signals from the specially encoded videocassette by the video program player;
  c) providing the encoded signals to the tactile bar; and
  d) selectively:
    i) moving the weights within the tactile bar to alter its weight distribution,
    ii) activating the vibrating motor to cause the tactile bar to vibrate,
    iii) activating the heating coil to warm the tactile bar, and
    iv) activating the semiconductor cooling device to cool the tactile bar, in response to the encoded signals.

* * * * *